United States Patent

[11] 3,633,261

[72] Inventor Fritz Grabe
Duisberg-Wanheimerort, Germany
[21] Appl. No. 30,861
[22] Filed Apr. 22, 1970
[45] Patented Jan. 11, 1972
[73] Assignee Vereinigte Draht- und Kabelwerke Akteingesellschaft Berlin und Duisburg
Berlin, Germany
[32] Priority Apr. 25, 1969
[33] Germany
[31] P 19 22 143.3

[54] SHEATHING TOOL
13 Claims, 2 Drawing Figs.

[52] U.S. Cl. ............................................. 29/202.5, 72/52
[51] Int. Cl. ........................................... B23p 19/04
[50] Field of Search ................................... 29/202.5, 203 C, 33.5, 33 D; 72/52, 166, 268

[56] References Cited
UNITED STATES PATENTS
3,397,442  8/1968  McGean .................... 29/202.5

*Primary Examiner*—Theron E. Condon
*Assistant Examiner*—Robert L. Spruill
*Attorney*—Spencer & Kaye ABSTRACT: A sheathing tool for continuously forming a band-shaped foil into a sheath around a moving strand material having a circular cross section, the tool being composed of a matrix having a circular cross section the diameter of which automatically varies to accommodate fluctuations which may occur in the diameter of the strand material. The matrix is constituted either by two rollers fastened to rotatably mounted shafts and having their peripheral edges contacting, each roller being provided with a semicircular cross section groove the diameter of which varies around the circumference of the roller, or by two identical ring segment pieces having eccentric inner diameters and attached to the outer surfaces of cylindrical rollers eccentrically fastened to the rotatably mounted shafts so that the peripheral edges of the pieces are concentric with the shafts and are always contacting. In both embodiments, the shafts are urged in a direction which tends to decrease the diameter of the matrix opening.

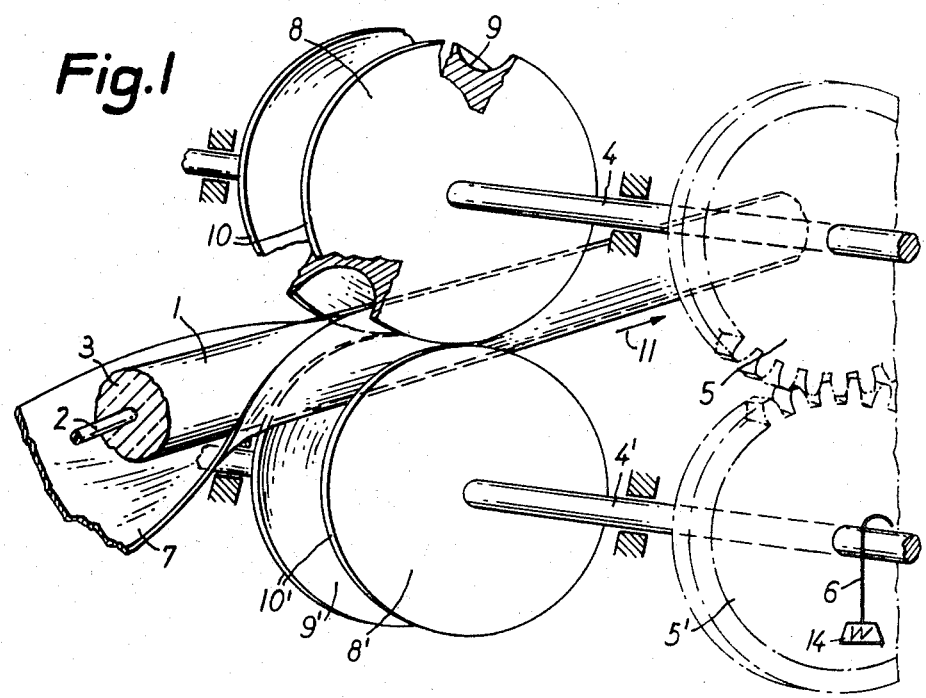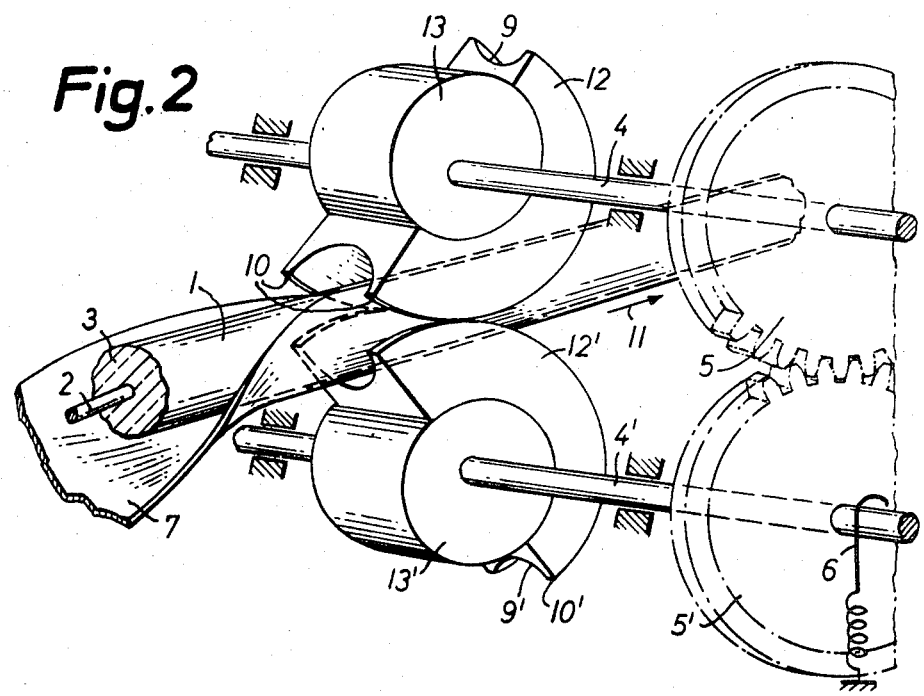

SHEATHING TOOL

BACKGROUND OF THE INVENTION

The present invention generally relates to a sheathing, or nipple, tool having a matrix for the continuous application of band-shaped foils onto a passing strand material having a circular cross section, and more particularly to such a tool for the sheathing of insulated cables with metal foils.

Sheathing tools are provided to place band-shaped foils arriving at the tool in a direction parallel to the strand material to be sheathed around the strand material so that the strand material, after passage through the tool, is sheathed by the foil. In order to sheath around the strand material in a manner which is as tight and uniform as possible, the diameter of the tool matrix must be adapted accurately to the diameter of the strand material plus twice the thickness of the foil.

A sheathing tool is known for this purpose which is provided with interchangeable matrices. Each matrix is provided with a circular opening having a defined diameter. For strand materials having different diameters the appropriate matrix must be inserted into the sheathing tool.

Thus, a rather large store of interchangeable matrices must always be held in readiness. When selecting the matrix to be inserted, it must be considered that certain fluctuations may occur in the diameter of the strand material. Particularly with cables which are insulated with foamed plastic, occasional fluctuations in the diameter must be taken into account which are caused by occasion inaccuracies in the amount of the synthetic component. A reduction in the diameter of the strand material has the result, when the known sheathing tool is employed, that the foil applied by means of the matrix is not in close enough contact with the surface of the strand material so that cavities are produced between the foil and the strand material which act as insulation faults. With an increase in the diameter of the strand material beyond a certain tolerance value there exists the danger, with the known sheathing tools, that the strand material gets caught in the matrix while passing through. This might cause the foil being applied to tear off or the strand material to stop moving. Particularly with cables to which a covering of a thermoplastic synthetic material is applied immediately after being sheathed in the metal foil, such an interruption in their passage can cause great damage because the stopped cable might be damaged or even destroyed in the extruder by the high temperatures prevailing therein.

SUMMARY OF THE INVENTION

It is therefore an object of the present invention to provide a sheathing tool having a variable diameter circular opening which automatically adapts itself to the momentary diameter of the strand material passing through so that the drawbacks of the known sheathing tool are eliminated.

According to the present invention, the foregoing and other objects are attained in one embodiment by providing a matrix which consists of two identical cylindrical rollers each of which are concentrically fastened to rotatably mounted parallel shafts. The outer surfaces of each roller are provided with a groove having a semicircular cross section which continuously decreases or increases, respectively, about the circumferences of the roller. The rollers are maintained in contact with one another at their peripheral edges with their grooves forming a circular opening. The diameter of this opening is variable by simultaneous counterrotation of the two matrix halves, and adjustable inverse torques are simultaneously applied in the direction which tends to decrease the diameter of the matrix opening.

A further embodiment of the sheathing tool according to the present invention is characterized in that the matrix consists of two identical ring segment pieces having eccentric inner diameters. The ring pieces are fastened to the outer surfaces of two cylindrical rollers which are eccentrically disposed on the two rotatably mounted parallel shafts. The outer surface of each ring segment piece is provided with a groove having a semicircular cross section of progressively variable diameter and the peripheral edges of the ring segment pieces are maintained in contact with one another in such a manner that the grooves provided in the ring segment pieces form a circular opening. As before, the diameter of this opening is variable by simultaneously counter rotating the matrix halves, and adjustable inverse torques are applied to both matrix halves in the direction which tends to reduce the diameter of the matrix opening.

In both embodiments, the two shafts on which the matrix halves are disposed are connected by a suitable lever system or a gear assembly which may consist, for example, of two identical meshing toothed wheels. According to the present invention, a force acts tangentially on one of the shafts which produces, via the gear assembly or the lever system, inverse torques on the matrix halves in the direction that reduces the circular opening disposed in the line of contact of the two matrix halves. This force may be produced, for example, by a weight or a spring.

The advantages of the present invention, are, in particular, that, instead of a plurality of matrices each having a fixed diameter, only a single matrix having a variable diameter is used and that the use of the sheathing tool according to the present invention assures a uniform sheathing of the strand material at any time, independent of fluctuations in its diameter. Moreover, there results the further advantage that increases in cost and material, which resulted from the use of the known sheathing tools having matrices with fixed openings due to tearing of the strand material because of too great an increase in the diameter, are avoided with the use of the sheathing tool according to the present invention which has a matrix opening which continuously adapts itself to the strand material. The sheathing tool of this invention can be used to particular advantage for the sheathing of cables insulated with foamed materials in which fluctuations in the diameter occur quite often as a result of occasional inaccuracies in the dosaging of the inserted foamed material component.

BRIEF DESCRIPTION OF THE DRAWINGS

FIG. 1 is a perspective view of one embodiment of the sheathing tool according to the present invention in which two rollers form the variable matrix.

FIG. 2 is a perspective view of another embodiment of the invention wherein the variable matrix is formed by two identical ring segment pieces having eccentric inner diameters.

DESCRIPTION OF THE PREFERRED EMBODIMENTS

Referring now to the drawings in which like reference numerals designated similar or corresponding parts in the two figures, and more particularly to FIG. 1, the strand material 1 to be sheathed, e.g. a cable 2 having a foamed plastic insulation 3, passes through the tool in the direction of arrow 11. A foil 7 enters the tool in a direction parallel to the cable, and the foil is placed tightly around the cable during passage through the tool. This is done in and by the circular opening formed by the semicircular grooves 9 and 9' at the point of contact of rollers 8 and 8'. Rollers 8 and 8' contact one another at their peripheral edges 10 and 10', and are fastened to rotatably mounted shafts 4 and 4', respectively. Shafts 4 and 4' are connected together by means of a suitable device as for example a lever system or a toothed gear assembly 5 and 5' so that there can be no slippage therebetween. In this way, a torque is produced by a force 6 acting tangentially on the shafts which torque is transmitted to both of rollers 8 and 8' in complete synchronism but in opposite directions. As shown in FIG. 1, the force 6 may be produced by a weight 14 acting through a moment arm (not shown) on the shaft 4'. A suitable moment arm may be provided by a pulley or lever, for example.

In FIG. 2, the foil 7 also enters into the sheathing tool parallel to the strand material 1 in the direction of arrow 11 and is placed tightly around the strand when it passes through the matrix formed by ring segment pieces 12 and 12'. The ring segment pieces 12 and 12' are each provided, in their outer surfaces, with conically extending grooves 9 and 9', respectively, having a semicircular cross section and thus form, when placed together in the illustrated manner, a circular opening in their line of contact. The diameter of the opening is continuously variable by equal rotation of the ring segment pieces 12 and 12' in respectively opposite directions. This rotation is made possible, according to the present invention, in that the ring segment pieces 12 and 12' are fastened on cylindrical rollers 13 and 13', respectively, which themselves are fastened eccentrically to rotatably mounted shafts 4 and 4', respectively. The inner diameters of pieces 12 and 12' are eccentric with respect to their outer edges 10 and 10' and eccentricity of the roller fastenings are so designed as to compensate for the conical course of the grooves provided in the ring pieces. The outer edges 10 and 10' of the ring segment pieces 12 and 12', however, are concentric with the shafts 4 and 4' so that contact of the ring pieces at their peripheral edges 10 and 10' is assured in any position. As shown in FIG. 2, the force 6 which produces the torque on shaft 4' may be produced by a spring 15.

In each of the illustrated embodiments, the flat sides of each matrix half, i.e. the sides transverse to the axes of shafts 4 and 4', are inclined with respect to one another so as to be closest together where the groove diameter of the matrix half is smallest and furthest apart where the groove diameter is largest.

Of course the embodiment of FIG. 2 would also be operative if the rollers 13 and 13' were mounted concentrically on their shafts and the inner circumference of each matrix half were concentric with its peripheral edges.

The sheathing tool according to the present invention operates in the same manner in both embodiments. That is, when the strand material 1 and foil 7 are pulled through the matrix formed by rollers 8 and 8' or ring segment pieces 12 and 12' in the direction of arrow 11, a friction force is produced through which rollers 8 and 8' or ring segment pieces 12 and 12' are imparted torques in the direction toward an increase in the matrix opening. Such an increase in the matrix opening, however, is desired only when it is required by an increase in the diameter of the cable or strand material. For this reason, rollers 8 and 8' or ring segment pieces 12 and 12' receive a torque caused by force 6 which is opposite to the torque produced by the frictional force. Force 6 acts tangentially on shaft 4' and is transmitted without slip to a second shaft 4 via a lever system or a gear assembly. This force 6 and the gear assembly, which may consist, for example, of two identical meshing toothed wheels 5 and 5', cause identical inverse torques on the rollers 8 and 8' or ring segment pieces 12 and 12' in the direction toward a decrease in the matrix opening. Appropriate selection of force 6 permits the matrix opening of the sheathing tool according to the present invention to be always exactly adapted to the diameter of the strand material 1 passing through, and foil 7 is placed around the cable with uniform pressure.

It will be understood by those skilled in the art that the sheathing tool according to the present invention as shown in the drawing represents only two possible embodiments which, however, clearly disclose the concept of the invention. The gear mechanism can also be replaced by other types, or a separate gear mechanism may be entirely eliminated if the matrix halves themselves are provided with a suitable device as, for example, meshing teeth at their peripheral edges 10 and 10'. Therefore, the disclosed constructions are not to be considered as limiting the invention except as defined by the appended claims.

It will be understood that the above description of the present invention is susceptible to various modifications, changes and adaptations, and the same are intended to be comprehended within the meaning and range of equivalents of the appended claims.

I claim:

1. A sheathing tool for the continuous application of a band-shaped foil to a moving strand material having a circular cross section, comprising: a pair of rotatably mounted parallel shafts; a matrix composed of two identical cylindrical rollers each concentrically fastened to a respective one of said parallel shafts, each said roller presenting an outer surface provided with a groove having a semicircular cross section whose size varies progressively about the circumference of said rollers, said rollers contacting one another at the peripheral edges of their outer surfaces so that their grooves form a circular opening in their line of contact, the diameter of which opening is variable by simultaneous counterrotation of the matrix halves; and means connected for applying adjustable inverse torques simultaneously to both rollers in the direction which tends to reduce the diameter of the matrix opening.

2. A sheathing tool as defined in claim 1, further comprising a gear mechanism connecting said shafts together.

3. A sheathing tool as defined in claim 2, wherein said gear mechanism is formed by two identical meshing toothed wheels.

4. A sheathing tool as defined in claim 2, wherein said means produces a force which acts tangentially on one of said shafts, which force effects inverse torques on the matrix halves in the direction of a reduction in size of the circular opening formed by the grooves.

5. A sheathing tool as defined in claim 4, wherein the force is generated by a weight.

6. A sheathing tool as defined in claim 5, wherein the force is generated by a spring.

7. A sheathing tool for the continuous application of band-shaped foil to a moving strand material having a circular cross section comprising: two rotatably mounted parallel shafts; two cylindrical rollers each mounted on a respective shaft; a matrix composed of two identical ring segment pieces each having a groove of semicircular cross section formed in its outer periphery, the size of the groove varying progressively along the periphery, and each fastened to the outer surface of a respective cylindrical roller; the outer peripheral edges of said pieces being in contact with one another in such a manner that the grooves provided therein form a circular opening in their line of contact, the diameter of said opening being variable by a simultaneous counterrotation of the matrix halves; and means connected for applying adjustable inverse torques simultaneously to both matrix halves in the direction which tends to reduce the diameter of the matrix opening.

8. A sheathing tool as defined in claim 7 wherein said cylindrical rollers are mounted eccentrically on said shafts and the inner circumference of each of said pieces is eccentric to its outer peripheral edges.

9. A sheathing tool as defined in claim 7, further comprising a gear mechanism connecting said shafts together.

10. A sheathing tool as defined in claim 9, wherein said gear mechanism is formed by two identical meshing toothed wheels.

11. A sheathing tool as defined in claim 9, wherein said means produces a force acting tangentially on one of said shafts, which force effects inverse torques on the matrix halves in the direction of a reduction in size of the circular opening formed by the grooves.

12. A sheathing tool as defined in claim 11, wherein the force is generated by a weight.

13. A sheathing tool as defined in claim 12, wherein the force is generated by a spring.

* * * * *